US008692030B1

(12) United States Patent
Ionescu et al.

(10) Patent No.: US 8,692,030 B1
(45) Date of Patent: Apr. 8, 2014

(54) BIOBASED-PETROCHEMICAL HYBRID POLYOLS

(75) Inventors: Mihail Ionescu, Pittsburg, KS (US); Zoran S. Petrovic, Pittsburg, KS (US); Ivan Javni, Pittsburg, KS (US)

(73) Assignee: Pittsburg State University, Pittsburg, KS (US)

( * ) Notice: Subject to any disclaimer, the term of this patent is extended or adjusted under 35 U.S.C. 154(b) by 324 days.

(21) Appl. No.: 11/407,521

(22) Filed: Apr. 20, 2006

(51) Int. Cl.
C07C 43/00 (2006.01)
C08G 18/00 (2006.01)

(52) U.S. Cl.
USPC ............ 568/620; 521/174; 568/623; 568/624

(58) Field of Classification Search
USPC ............... 502/175; 521/172, 174; 528/1, 620, 528/623; 568/620, 623, 624
See application file for complete search history.

(56) References Cited

U.S. PATENT DOCUMENTS

| | | | | |
|---|---|---|---|---|
| 3,504,038 | A * | 3/1970 | Beal | 568/469 |
| 4,786,705 | A * | 11/1988 | Koleske | 528/72 |
| 4,826,944 | A | 5/1989 | Hoefer et al. | |
| 5,237,080 | A | 8/1993 | Daute et al. | |
| 5,250,582 | A * | 10/1993 | Hire et al. | 521/154 |
| 5,313,000 | A * | 5/1994 | Stewart | 568/613 |
| 5,442,082 | A | 8/1995 | Uphues et al. | |
| 5,688,989 | A | 11/1997 | Daute et al. | |
| 5,697,984 | A | 12/1997 | Swatzing et al. | |
| 6,313,060 | B1 * | 11/2001 | Sugiyama et al. | 502/175 |
| 6,420,433 | B2 | 7/2002 | DiSanto | |
| 6,433,121 | B1 * | 8/2002 | Petrovic et al. | 528/1 |
| 6,486,361 | B1 | 11/2002 | Ehlers et al. | 568/620 |
| 6,563,007 | B2 * | 5/2003 | Dinsch et al. | 568/679 |
| 6,649,667 | B2 * | 11/2003 | Clatty | 521/170 |
| 7,071,248 | B2 * | 7/2006 | Chen et al. | 524/14 |
| 2002/0172565 | A1 * | 11/2002 | Markusch et al. | 405/302.7 |
| 2003/0191274 | A1 * | 10/2003 | Kurth et al. | 528/74.5 |
| 2004/0249107 | A1 * | 12/2004 | Muller et al. | 528/76 |
| 2005/0014637 | A1 * | 1/2005 | Duijghuisen et al. | 502/175 |
| 2005/0070620 | A1 * | 3/2005 | Herrington et al. | 521/155 |
| 2005/0240063 | A1 * | 10/2005 | Ostrowski et al. | 568/679 |
| 2008/0125569 | A1 * | 5/2008 | Wehmeyer et al. | 528/361 |
| 2009/0216040 | A1 * | 8/2009 | Benecke et al. | 560/155 |

FOREIGN PATENT DOCUMENTS

EP 0130458 A2 * 1/1985
WO WO 2004/020497 3/2004

OTHER PUBLICATIONS

EP 0130458—English Translation.*
Derwent, Abstract of JP 2005-05297 A, Aug. 4, 2005.*

* cited by examiner

*Primary Examiner* — Melissa Rioja
(74) *Attorney, Agent, or Firm* — Spencer Fane; Britt & Browne LLP

(57) ABSTRACT

A method of making a biobased-petrochemical hybrid polyol is provided. This method includes reacting a cyclic ether with a vegetable oil-based polyol in the presence of a cationic catalyst or a coordinative catalyst that includes a vegetable oil-based polyol ligand to form the biobased-petrochemical hybrid polyol. The biobased-petrochemical hybrid polyol that is created has a number average molecular weight of about 3,000 to about 6,000 and has a structure that is about 22% to about 36% biobased. In one aspect of the present invention, the cyclic ether is propylene oxide, and the propoxylated polyol formed from the propylene oxide and vegetable oil-based polyol is then reacted with ethylene oxide in the presence of a superacid catalyst to create a block copolymer with a terminal polyethylene oxide block having a high percentage of terminal primary hydroxyl groups. If the cyclic ether is a homogeneous mixture of ethylene oxide and propylene oxide, then propylene oxide-ethylene oxide random copolymers are formed by polyaddition to vegetable oil polyols. The biobased-petrochemical hybrid polyol may be reacted with an isocyanate so as to create a flexible polyurethane that has good hydrolytic resistance.

18 Claims, No Drawings

BIOBASED-PETROCHEMICAL HYBRID POLYOLS

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention relates to making polyols that are useful in making flexible polyurethane foams. More specifically, the present invention relates to making hybrid polyols that have a vegetable oil-based polyol segment and a petrochemical polyol segment.

2. Description of Related Art

Petrochemical polyols have been made by the polyaddition reaction of an alkylene oxide, such as propylene oxide and/or ethylene oxide, to the hydroxyl groups of liquid glycerol in the presence of a potassium hydroxide catalyst. The polyols created from such a process are branched or star polyols. One disadvantage with petrochemical polyols is that they are not made from renewable resources. Another disadvantage with petrochemical polyols is that they are not sufficiently hydrophobic so as to be useful in creating polyurethanes with good hydrolytic resistance.

Biobased-petrochemical hybrid polyols have been made by the alkoxylation of vegetable oil-based polyols in the presence of an alkaline catalyst. Specifically, alkaline catalysts, such as hydroxides and alkoxides of sodium or potassium have been used. Examples of alkaline catalysts that have been used to created biobased-petrochemical hybrid polyols are NaOH, KOH, $CH_3OK$, and $CH_3ONa$. One disadvantage with such current methods of making biobased-petrochemical hybrid polyols is that these alkaline catalysts split the ester bonds of the triglyceride, and the alkylene oxides are inserted between the glycerol and the fatty acid groups in addition to being added by polyaddition to the hydroxyl groups of the vegetable oil polyol. Another disadvantage of using an alkaline catalyst to create biobased-petrochemical hybrid polyols is that the reaction rate is slow and must occur at high temperatures, namely, at temperatures above 100° C. and many times above 130° C.

In order to overcome these disadvantages, a method for making a biobased-petrochemical hybrid polyol that avoids the splitting of ester bonds and that avoids the creation of side chains and that limits the formation of cyclic oligomers, such as dimers and tetramers, is needed. This process should produce polyols that are useful for making of flexible polyurethane foams.

BRIEF SUMMARY OF THE INVENTION

It is an object of the present invention to provide a method of making biobased-petrochemical hybrid polyols that are useful in making flexible polyurethane products.

The foregoing and other objects are provided by a method of making a biobased-petrochemical hybrid polyol. This method includes reacting a cyclic ether with a vegetable oil-based polyol in the presence of a cationic catalyst or a coordinative catalyst that includes a vegetable oil-based polyol ligand. The biobased-petrochemical hybrid polyol that is created has a number average molecular weight of about 3000 to about 6000 and has a structure that is about 22 to about 36% by weight biobased. The biobased-petrochemical hybrid polyol may be reacted with isocyanates so as to create a flexible polyurethane that has good hydrolytic resistance. In one aspect of the present invention, the cyclic ether is propylene oxide and the propoxylated polyol formed from the propylene oxide and vegetable oil-based polyol is then reacted with ethylene oxide in the presence of a superacid catalyst to create a block copolymer with a terminal polyethylene oxide block having a high percentage of terminal primary hydroxyl groups. In another aspect of the present invention, a mixture of propylene oxide and ethylene oxide is used, and random copolymers of propylene oxide-ethylene oxide are obtained.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The biobased-petrochemical hybrid polyols of the present invention are obtained by the polyaddition of cyclic ethers to the hydroxyl groups of a vegetable oil-based polyol in the presence of a cationic catalyst or a coordinative catalyst that includes a vegetable oil-based polyol ligand. The structure created is a hybrid structure having a biobased segment (from the initial vegetable oil-based polyol) and a petrochemical segment (the polyether chains).

The vegetable oil-based polyol, which provides the hydroxyl groups that are used to start the polyaddition reaction, may, but not necessarily will, be obtained by (1) reaction of alcohol with epoxidized oils, (2) hydroformylation, (3) hydrogenation of epoxidized oils, or (4) ozonolysis. Preferably, the polyol that is used as a starter has a hydroxyl number in the range of about 100 to about 600 mg KOH/g. Preferably, this starter polyol has a hydroxyl number of about 160 to about 250 mg KOH/g. The vegetable oil-based polyol preferably has a viscosity of about 0.5 to about 30 Pa·s at 25° C. and preferably has a number average molecular weight of about 600 to about 1200. Most preferably, the vegetable oil-based polyol has a viscosity of about 0.5 to about 17 Pa·s at 25° C.

The structure of a vegetable oil-based polyol obtained by reaction of alcohols with epoxidized oils is shown below as structure A:

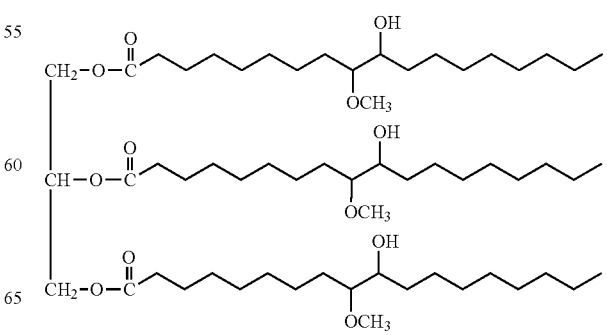

The structure of a vegetable oil-based polyol obtained by hydroformylation is shown below as structure B:

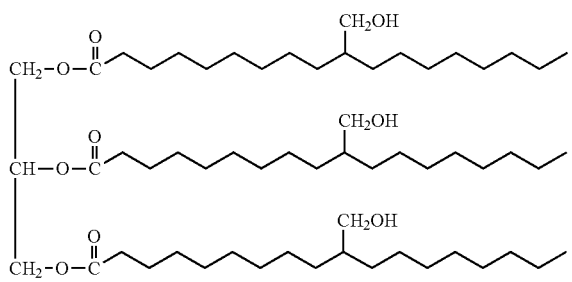 [SMILES: CCCCCCCCC(CO)CCCCCCCCC(=O)OCC(COC(=O)CCCCCCCCC(CO)CCCCCCCC)OC(=O)CCCCCCCCC(CO)CCCCCCCC]

The structure of a vegetable oil-based polyol obtained by hydrogenation of epoxidized oils is shown below as structure C:

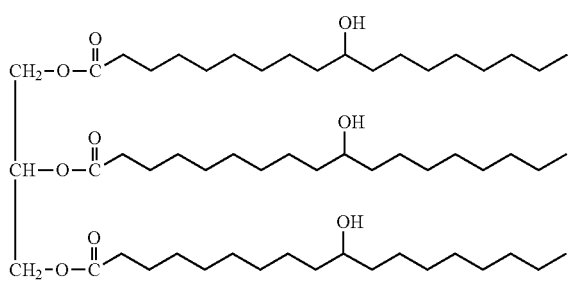 [SMILES: CCCCCCCCC(O)CCCCCCCCC(=O)OCC(COC(=O)CCCCCCCCC(O)CCCCCCCC)OC(=O)CCCCCCCCC(O)CCCCCCCC]

The structure of a vegetable oil-based polyol obtained by ozonolysis is shown below as structure D:

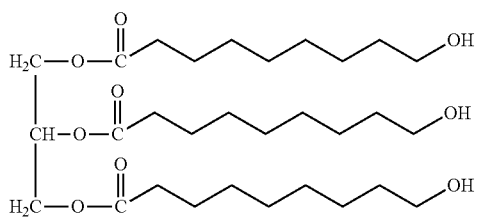 [SMILES: O=C(CCCCCCCCO)OCC(COC(=O)CCCCCCCCO)OC(=O)CCCCCCCCO]

Any vegetable oil may be used to form the vegetable oil-based polyol used in this process. Examples of vegetable oils that may be used include, but are not limited to, soybean oil, safflower oil, linseed oil, corn oil, sunflower oil, olive oil, canola oil, castor oil, sesame oil, cottonseed oil, palm oil, peanut oil, rapeseed oil, tung oil, fish oil, or a blend of any of these oils. In one embodiment of the present invention, castor oil is used, as it is an excellent initiator for making the hybrid polyols of the present invention. Alternatively, any partially hydrogenated vegetable oils or genetically modified vegetable oils can be used to obtain a polyol with a particular hydroxyl number. Examples of partially hydrogenated vegetable oils or genetically modified vegetable oils that may be used to form the vegetable oil-based polyol include, but are not limited to, high oleic safflower oil, high oleic soybean oil, high oleic peanut oil, high oleic sunflower oil, and high erucic rapeseed oil (crambe oil). Preferably, the vegetable oil-based polyols that are used in making the hybrid polyols of the present invention are soy-based polyols. The term vegetable oil, as used throughout this application, is meant to include all of the oils listed above plus other vegetable oils not listed.

There are various methods of synthesizing polyols from vegetable oil that are well know in the art. Preferably, the polyols are made by the methods described in U.S. Pat. No. 6,107,433 entitled PROCESS FOR THE PREPARATION OF VEGETABLE OIL-BASED POLYOLS AND ELECTROINSULATING CASTING COMPOUNDS CREATED FROM VEGETABLE OIL-BASED POLYOLS and U.S. Pat. No. 6,433,121 entitled METHOD OF MAKING NATURAL OIL-BASED POLYOLS AND POLYURETHANES THEREFROM, both of which are incorporated by reference in their entireties.

The cyclic ether used to create the hybrid polyols of the present invention may include, but is not limited to, alkylene oxides, oxetanes, and tetrahydrofurans. The higher cyclic ethers, i.e., oxetanes and tetrahydrofurans, that are used should have an alpha position free and, if substituents are present, they should be in the beta position to the oxygen atom in the ring. Such alkylene oxides may include, but are not limited to, ethylene oxide, propylene oxide, butylene oxide and combinations thereof. If butylene oxide is selected, preferably, 1,2-butylene oxide or 1,4-butylene oxide is used.

The cationic catalysts that may be used in making the hybrid polyols of the present invention include, but are not limited to, Lewis and Bronstedt acids. Specific examples of cationic catalysts that may be used include, but are not limited to, $BF_3{}^*Et_2O$, $HBF_4$, $HPF_6$, $HSbF_6$, $Al[CF_3SO_3]_3$, $CF_3SO_3H$ (triflic acid) and $SbF_5$. Most preferably, the cationic catalyst chosen for use in the process of the present invention is tetrafluoroboric acid ($HBF_4$) in diethyl ether.

Coordinative catalysts for use in the polyaddition reaction of the present invention include, but are not limited to, dimetallic catalysts that include a vegetable oil-based polyol ligand (Veg.Ligand). Dimetallic catalysts that include a vegetable oil-based polyol are nonstoichiometric complexes with the following general formulas:

$$Zn_3[Co(CN)_6]_2{}^*xZnCl_2{}^*y\text{Veg.Ligand}^*zH_2O$$

$$Zn_3[Co(CN)_6]_2{}^*{}_xZnCl_2{}^*w\text{Ligand}_1{}^*y\text{Veg.Ligand}_2{}^*zH_2O$$

where there preferably is an approximate 1:1 ratio of $Zn_3[Co(CN)_6]_2$ to $ZnCl_2$, preferably the complex has 2 ligands, and z is 0 to about 3% by weight of the entire dimetallic catalyst complex. In place of cobalt, other transition metals, such as, but not limited to, iridium, platinum, and chromium may be used. Chlorine may be replaced with other halogens, such as, but not limited to, bromine. Dimetallic catalysts are obtained by the reaction of an aqueous solution of $ZnCl_2$ with a potassium hexacyanocobaltate aqueous solution or hexacyanocobaltic acid aqueous solution. The $Zn_3[Co(CN)_6]_2$ precipitates in the form of a white suspension that is complexed with at least one vegetable oil-based polyol ligand. The complex is filtered, washed and dried. If more than one ligand is present in this complex, the other ligand besides the vegetable oil-based polyol ligand may be, but is not limited to, 1,4-dioxane, dimethyl ethers of ethylene glycol, dimethyl ethers of diethylene glycol, tert-butyl alcohol, tert-butyl ether of diethylene glycol, tert-amyl alcohol, dimethyl sulfoxide, mono methyl ether of propylene glycol, mono-methyl ether of dipropylene glycol, ethylene glycol mono tert-butyl ether, and a vegetable oil-based polyol. If two ligands are used in the coordinative catalyst, the non-vegetable oil-based polyol ligand should be about 4 to about 7% by weight of the total weight of the coordinative catalyst and preferably about 6 to about 7% by weight. The vegetable oil-based polyol ligand should be about 15-30% by weight of the total weight of the coordinative catalyst used and preferably about 20-25% by weight. The Zn preferably is about 20 to about 21% by weight of the catalyst and the Co preferably is about 9.5 to about 11% by weight of the catalyst. Preferably, when reacting a particular vegetable oil-based polyol with a cyclic ether in the presence of a coordinative catalyst, the ligands of the coordinate catalyst include a tert-butyl alcohol ligand and a ligand of the same vegetable oil-based polyol that is used as a reactant. This improves the compatibility between the catalyst with the reactants. As a consequence, the polymerization reaction begins quickly with a high reaction rate and a minimal to no induction period.

Vegetable oil-based polyols, especially the polyols obtained by ring opening of epoxidized oils with methanol, are excellent dimetallic catalyst ligands for a polyaddition reaction. After a short induction period of about 20 to about 60 minutes, the reaction initiated by the vegetable oil-based polyols takes place with a high reaction rate using such a dimetallic catalyst at a concentration of about 50 to about 300 ppm. The polyols obtained using such a dimetallic catalyst do not require purification due to the low concentration of catalyst used. Dimetallic catalysts are especially suited for being used in preparing polyols having a biobased segment whereas glycerol cannot be alkoxylated directly if it is merely in the presence of a dimetallic catalyst.

Dimetallic catalysts are the most efficient catalysts discovered for propylene oxide polymerization. An advantage of using dimetallic catalysts is the very low content of terminal double bonds because of a very low extent of rearrangement of propylene oxide to allyl alcohol.

The polyaddition reaction of a cyclic ether to the hydroxyl groups of vegetable oil-based polyols is shown below using a preferred cyclic ether:

More broadly, the cyclic ether that is reacted with the hydroxyl groups of vegetable oil-based polyol may have the structure shown below:

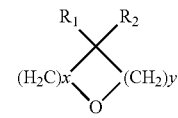

If $x=1$, $y=0$, and $R_1=H$, an alkylene oxide of the following structure is formed:

wherein R is H, $CH_3$, $CH_2CH_3$, $(CH_2)_m$—$CH_3$, $CH_2OCH_3$, $CH_2Cl$, $CH_2Br$, phenyl, phenoxy, methoxy, or styrene. If $x=1$ and $y=1$, an oxetane of the following structure is formed:

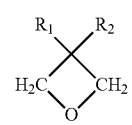

wherein $R_1$ is H, $CH_3$, $C_2H_5$, $C_3H_7$, phenyl, phenoxy, methoxy, or styrene and $R_2$ is H, $CH_3$, $C_2H_5$, $C_3H_7$, phenyl, phenoxy, methoxy, or styrene. If $x=2$ and $y=1$, a tetrahydrofuran of the following structure is formed:

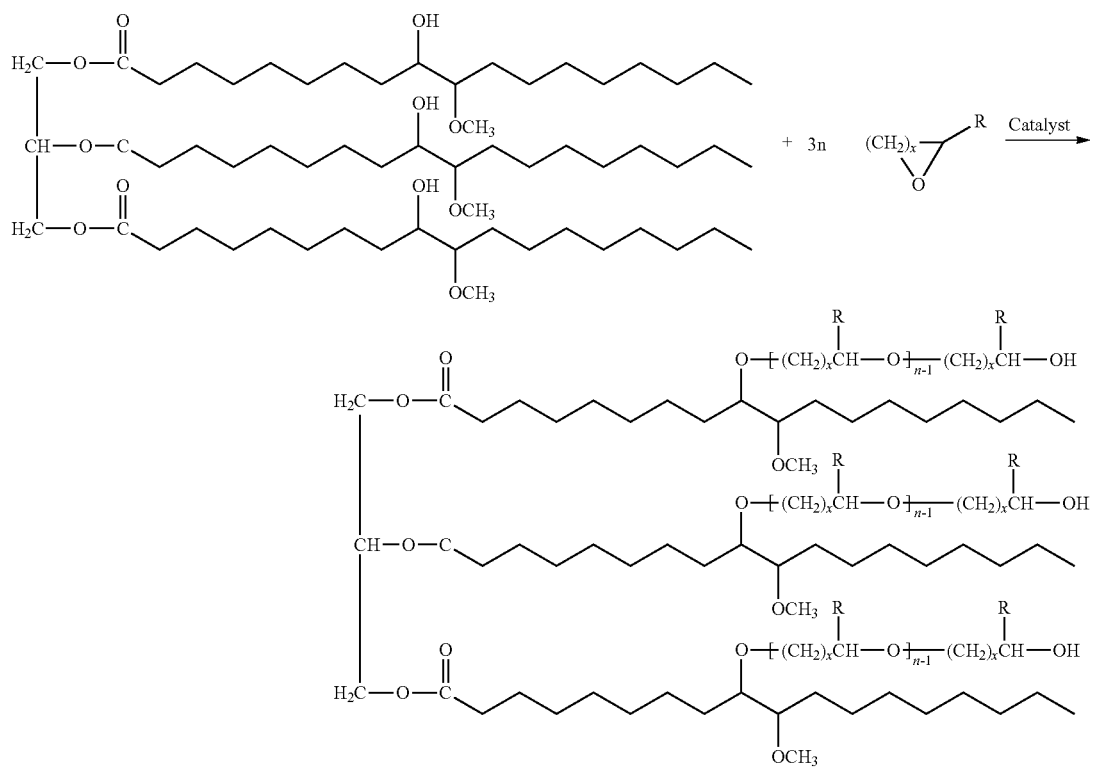

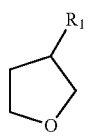

wherein R is H, CH$_3$, C$_2$H$_5$, C$_3$H$_7$ or other alkyl groups. The structures described above may be reacted with the vegetable oil-based polyols.

Preferably, when using a cationic catalyst, the reaction is carried out by very slow addition of the cyclic ether to the vegetable oil-based polyol at lower temperatures so as to minimize the formation of cyclic oligomers from the cyclic ether. Most preferably, when using a cationic catalyst, the reaction is carried out at about −10 to about 10° C. Preferably, when using a cationic catalyst, the reaction takes place under a protective atmosphere of nitrogen at lower temperatures for several hours. Preferably, the reaction takes place for about 4 to about 8 hours.

Because of the high viscosity of vegetable oil-based polyols at low reaction temperatures, a solvent should be used in the polyaddition reaction of the present invention when using a cationic catalyst. One example of an appropriate solvent is methylene chloride. Preferably, the methylene chloride is about 25% to about 50% by weight of the reaction mixture. Practically speaking, the synthesis takes place by the addition of cyclic ethers to a solution of vegetable oil-based polyol and cationic catalyst in methylene chloride. After the reaction takes place, the cationic catalyst is neutralized. Preferably, a weak anion exchange resin is used, such as, but not limited to, Lewatite 69 (weak anion exchange resin with tertiary amino groups) or other solid bases such as, but not limited to, CaO, Ca(OH)$_2$, MgO, or hydrotalcite. The polymer solution is filtered, and the solvent is removed by vacuum distillation.

When using a dimetallic catalyst, the vegetable oil-based polyol and the catalyst are charged in a pressure reactor under an inert atmosphere of nitrogen. The mixture is heated to about 105 to about 125° C. At this temperature, a quantity of a cyclic ether, such as propylene oxide (b.p. 33 to 34° C.), is added to generate a pressure of about 40 to about 60 p.s.i. After about 20 to about 60 minutes, the pressure decreases, and this is when the catalyst is activated. At this point, a continuous addition of propylene oxide is started. A high addition rate of propylene oxide is required to maintain a constant pressure of about 30 to about 40 p.s.i. The polyols obtained with dimetallic catalysts are more viscous than the polyols obtained with cationic catalysts. These polyols have a viscosity of about 3 to about 6 Pa·s at 25° C. The hydroxyl number of the hybrid polyol created is about 28 to about 58 mg KOH/g, and the molecular weight is about 3000 to about 6000. One advantage of using a dimetallic catalyst in making the hybrid polyol of the present invention is that it does not require any special equipment, and the polymerization reaction can be carried out in existing polyether polyol plants without modifications.

The biobased-petrochemical hybrid polyols that are created are transparent and have a slightly yellow color. Their viscosity is about 1.5 to about 3 Pa·s at 25° C., and they have a hydroxyl number of about 35 to about 60 mg KOH/g. They have a molecular weight of about 3,000 to about 6,000. They are about 22 to about 36% biobased.

In order to avoid the formation of cyclic oligomers, such as dimers, trimers, and tetramers, from the cyclic ethers during the cationic polymerization process, an excess of hydroxyl groups preferably is used in the presence of the cyclic ether groups. Practically, this is accomplished by very slow addition of the cyclic ether to the vegetable oil-based polyol at low temperatures. Most preferably, this reaction is carried out at a temperature of about −10 to about 30° C. Under these conditions, only minor amounts of cyclic oligomers are formed, and it is possible to obtain high molecular weight biobased-petrochemical hybrid polyols.

Maximum temperatures of about 40 to about 45° C. may be used for ethoxylation reactions by a cationic mechanism when ethylene oxide is added at a very slow rate. In these conditions, practically no cyclic oligomers are formed from ethylene oxide.

If propylene oxide is the sole cyclic ether monomer used in the polyaddition reaction of the present invention, then propylene oxide homopolymers are formed. Preferably, if forming propylene oxide homopolymers, they are formed in the presence of a dimetallic catalyst having a vegetable oil-based polyol ligand. Likewise, if ethylene oxide is the sole cyclic ether monomer used in this polyaddition reaction, then ethylene oxide homopolymers are formed.

By reacting a mixture of propylene oxide and ethylene oxide with a vegetable oil-based polyol, random copolymers of propylene oxide-ethylene oxide are formed. Preferably, in making random copolymers, the propylene oxide and ethylene oxide mixture contains about 10% to about 20% ethylene oxide. Forming random copolymers of PO-EO containing 10-20% EO substantially improves the compatibility of polyols with water in the foaming process, resulting in a very uniform cellular structure. Such random copolymers of PO-EO are useful in making continuous flexible polyurethane slabstock foams.

By using a step-wise addition of two different cyclic ethers, block copolymers can be created. In a preferred embodiment of the present invention, polyaddition with propylene oxide proceeds first followed by polyaddition with ethylene oxide to give block copolymers of propylene oxide-ethylene oxide with a terminal polyethylene oxide block. Preferably, this block copolymer has a high percentage of terminal primary hydroxyl groups. Most preferably, it has about 60% to about 80% terminal primary hydroxyl groups. Preferably, the ethoxylation reaction takes place in the presence of superacids at moderate temperatures. Examples of suitable superacids include, but are not limited to, HBF$_4$ and CF$_3$SO$_3$H. Preferably, the ethoxylation reaction takes place at a temperature of about 30 to about 45° C.

In order to prepare block copolymers with dimetallic catalysts having vegetable oil-based polyol ligands, the catalyst must be switched in the middle of the process. It is very difficult to polymerize ethylene oxide with a coordinative catalyst, as described below in Example 7. A very convenient route to making block copolymers is to prepare the first polypropylene oxide blocks by a coordinative mechanism and then synthesize poly[EO] blocks using a cationic mechanism in the presence of superacids as catalysts. For example, after propylene oxide polymerization with a dimetallic catalysts, a new catalyst is added and an ethoxylation reaction is carried out by cationic or anionic polymerization. For instance, first, a dimetallic catalysts is used when reacting propylene oxide with a vegetable oil-based polyol, and then HBF$_4$ is added, and the ethoxylation is carried out as pure cationic polymerization. Even though the propylene oxide polymerization step using a dimetallic catalyst needs no purification, the catalyst used in the ethoxylation step of making block copolymers needs to be removed. Block copolymers obtained with ethoxylation in the presence of acid catalysts need a purification step for elimination of the acidic catalyst.

It is impossible to start the propylene oxide polyaddition with a coordinative catalyst when using glycerol as a starter. It is necessary first to obtain an adduct of propylene oxide to glycerol by using another catalysts (e.g. KOH). Then, the polyaddition of propylene oxide to this adduct is possible in the presence of a coordinative catalyst. One advantage of this invention is the direct addition of propylene oxide to the vegetable oil-based polyol in the synthesis of hybrid polyols.

In addition, coordinative catalysts do not inhibit the catalytic activity of the cationic catalyst. At the same time, coordinative catalysts are practically inactive at the low temperatures (35 to 45° C.) used for ethoxylation in acid catalysis. Unfortunately, the acid catalyst must be removed because tertiary amines used as catalysts in polyurethane fabrication are blocked by the acids used for cationic polymerization.

The homopolymer, random copolymer and block-copolymer structures that are created are shown below as structures E, F, and G, respectively:

Structure E

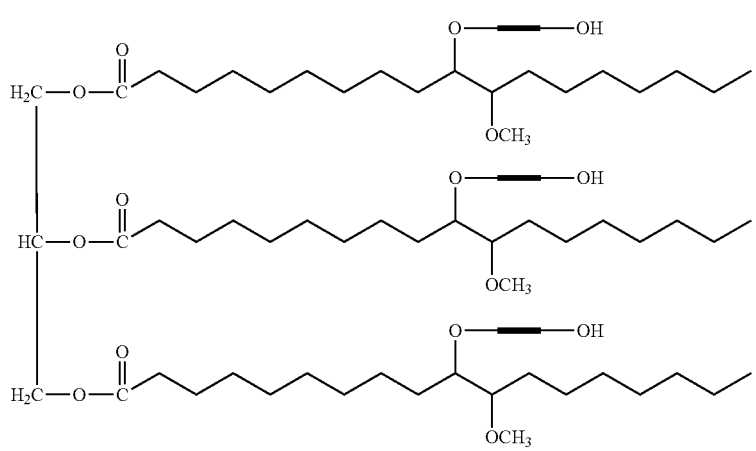

Structure F

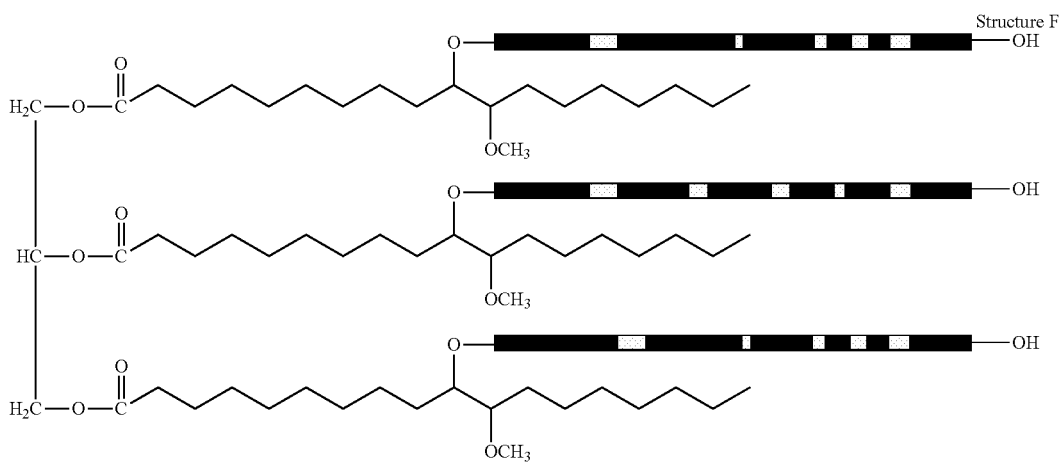

Structure G

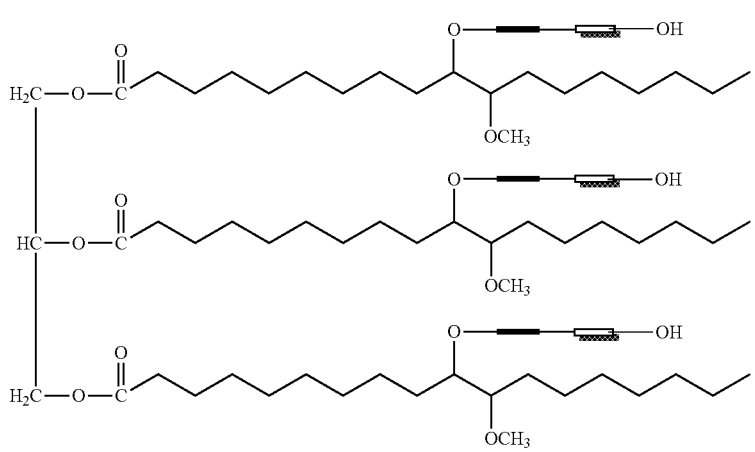

The biobased-petrochemical hybrid polyols of the present invention provide considerable economy in the use of energy and raw materials over petrochemical polyols. In addition to being made partially from renewable resources, the hybrid polyols of the present invention require less energy to make because less alkylene oxide must be added when the starter polyol used (e.g., a vegetable oil-based polyol) has a higher molecular weight than a glycerol starter. For example, if making a polyol with a number average molecular weight of about 3000, less cyclic ether needs to be added to a vegetable oil-based polyol starter having a number average molecular weight of approximately 1000 than needs to be added to a glycerol starter, which has a molecular weight of 92.

The use of cationic catalysts in making the hybrid polyols of the present invention allows the polyaddition reaction to be accomplished much quicker than when using an anionic catalyst, as done in the prior art. Still further, by using a cationic catalyst, the reaction may be carried out at lower temperatures, which also saves energy.

The hybrid polyols created by the process of the present invention are useful for making polyurethanes. In forming a polyurethane, the biobased-petrochemical hybrid polyol and an isocyanate are combined in approximately stoichiometric quantities. The polyol and the isocyanate are mixed at a temperature between about room temperature and about 120° C. The isocyanate reacts with the hydroxyl groups of the hybrid polyol. The aforementioned range of temperatures is used to reduce the viscosity of the polyol and improve the mixing of the polyol and the isocyanate. Preferably, no more than about 10% in excess of the stoichiometric quantity of either of these components is used.

Any type of isocyanate may be used in forming the polyurethane. Examples of isocyanates that can be used include, but are not limited to, toluene diisocyanate (TDI), a mixture of isomers 2,4 TDI and 2,6 TDI, polymeric or crude diphenylmethane diisocyanate (MDI), pure MDI, prepolymers of MDI, modified MDI, a mixture of MDI and TDI, hydrogenated MDI, hexamethylene diisocyanate (HMDI), isophorone diisocyanate, and 2,4-toluene diisocyanate (TDI). The selection of the isocyanate component affects the crosslinking of the polyurethane resin that is created.

The block copolymers of propylene oxide-ethylene oxide with a terminal polyethylene oxide block having a high percentage of terminal primary hydroxyl groups display high reactivity with isocyanates. The reactivity of primary hydroxyls with —NCO groups of aromatic isocyanates is around three times higher than the reactivity of secondary hydroxyls. When using vegetable oil-based polyols as starters to make block copolymers, the preferred way to generate primary hydroxyls on the polyethylene oxide block is to perform the ethoxylation reaction in the presence of a cationic catalyst. The polyol block PO-EO copolymers with a terminal poly[EO] block are useful for making molded flexible polyurethane foams. Such block copolymers of high molecular weights are especially useful in making molded flexible polyurethane foams for car seating.

The following are examples of biobased-petrochemical hybrid polyols of the present invention and methods of making these polyols that are within the scope of the present invention. These examples are offered by way of illustration and are not intended to limit the scope of the invention in any manner.

Example 1

PO Homopolymers by Cationic Mechanism

A glass reactor with mantle linked to a cryostat, reflux condenser, stirrer, dropping funnel, thermometer and nitrogen admission was charged with 50 parts by weight of a soybean polyol obtained by the reaction of epoxidized soybean oil with methanol (having hydroxyl number OH#=171 mg KOH/g, viscosity of 7.3 Pa·s at 25° C., number average molecular weight Mn=1100 and functionality f=3.2 OH groups/mol), 50 parts by weight of methylene chloride ($CH_2Cl_2$) as a solvent and 0.22% by weight $HBF_4$ solution (in a solution of diethyl ether that is 54% by weight $HBF_4$) as a cationic catalyst. Nitrogen gas was bubbled through the reaction mixture for 20-30 minutes in order to generate an inert atmosphere. The reaction mass was cooled to 0° C. The monomer, propylene oxide (PO) was added to the reaction mixture, at a very slow addition rate over 4-8 hours using a dropping funnel while maintaining the temperature of the reaction mass in the range of 0-10° C. If the temperature increased above the limit, the addition of PO was stopped until the temperature fell within the limits. Around 135 parts by weight of PO were added in this manner. After the addition of the total quantity of PO, the reaction mass was maintained under continuous stirring, between 0-10° C., for around 1 hour to complete the reaction. After this period of time, a weak anion exchanger with tertiary amino groups (Lewatite 69) (around 1-3% by weight of the final polyol) was added to the reaction mixture under continuous stirring at room temperature, in order to remove the acid catalyst. After 1-2 hours, the solids were removed by filtration under pressure (40-60 p.s.i) and the solvent, methylene chloride (boiling point 39° C.) and traces of unreacted PO (boiling point 36° C.) were removed by vacuum distillation at 60-80° C. and 60-100 mmHg. The result was a hybrid polyol, which was a transparent, light yellow liquid, in a high yield (92%), having a hydroxyl number of 58 mg KOH/g, Mn=3200, a viscosity of 2.2 Pa·s at 25° C., and an acidity of 0.2 mg KOH/g. The content of cyclic oligomers (cyclic dimers and tetramers of PO), determined by gel permeation chromatography, was less than 1%. The biobased part of this hybrid polyol was around 27% by weight.

Example 2

Random Copolymers of Propylene-Oxide (PO) and Ethylene Oxide (EO) by Cationic Mechanism Random copolymers of PO-EO were obtained in the same way as the PO homopolymers of Example 1 except that, instead of PO, a homogeneous mixture of PO-EO (containing around 15% by weight EO) was added to the soy-polyol starter. Thus, the same reactor, as described in Example 1, was charged with 50 parts by weight soy polyol having an OH#=171 mg KOH/g, 50 parts by weight of methylene chloride and 0.22% by weight $HBF_4$ solution (in a solution of diethyl ether that is 54% by weight $HBF_4$). 130 parts by weight of a homogeneous mixture of PO-EO containing 15% by weight EO, at 0-9° C., was added slowly over 4-6 hours. In order to prevent loss of EO by evaporation (b.p.=10.8° C.), a funnel with mantle, linked to a cryostat, having a cooling fluid at a temperature in the range of −5 to 0° C. was used. After the catalyst neutralization, filtration and solvent removal by vacuum distillation, as in Example 1, a hybrid random PO-EO copolymer initiated by a soybean polyol was obtained in a 92% yield. It had an OH#=54 mg KOH/g, Mn=3420, a viscosity of 3.3 Pa·s at 25° C. and an acidity of 0.3 mg KOH/g. The biobased content of this hybrid biobased random copolymer PO-EO polyol was around 27.7%.

Example 3

Random Copolymers of Propylene Oxide (PO) and 1,4 butylene oxide (THF) by Cationic Mechanism The reactor described in Example 1 was charged with 50 parts by weight of soybean polyol having an OH#=171 mg KOH/g, 65 parts by weight of tetrahydrofuran (THF), and 0.22% by weight $HBF_4$ solution (in a solution of diethyl ether that is 54% by weight $HBF_4$). The temperature of the reaction mass was maintained at 15 to 25° C. After that, 65 parts by weight of PO were added slowly over 4 to 6 hours using a dropping funnel while maintaining the temperature between 15 to 25° C. After the addition of the total quantity of monomer, the reaction mixture was stirred for around 1 hour for the complete consumption of unreacted PO and THF monomers to occur. The removal of the acidic catalyst was the same as in Example 1. The unreacted monomers were removed by vacuum distillation. Around 5 parts of a liquid, which was shown to be tetrahydrofuran, was collected. The result was a transparent hybrid polyol, a random PO-THF copolymer initiated by a soybean polyol. It had an OH#=44 mg KOH/g, a viscosity of 3.3 Pa·s at 25° C. and an acid number of 0.2 mg KOH/g. The biobased part of this polyol was around 28.5% by weight. The synthesized polyol had only secondary terminal hydroxyl groups.

Example 4

Random Copolymer Ethylene Oxide and 1,4 butylene oxide by Cationic Mechanism A hybrid polyol, which was a random copolymer of ethylene oxide-tetrahydrofuran, was prepared based on the same soybean polyol used as a starter in Examples 1-3. It was prepared in the same way as in Example 3 with the difference that, instead of 65 parts by weight of PO being added, 65 parts by weight of ethylene oxide (cooled at 5° C.) were added over 6 hours, at 5 to 9° C. The polyol was purified as in Example 3. A transparent polyol having an OH#=44.8 mg KOH/g, a viscosity of 5.2 Pa·s at 25° C. and an acid number 0.23 mg KOH/g was obtained. This hybrid polyol contained around 29% biobased part and had 100% primary hydroxyl groups.

Example 5

Block Copolymers of PO-EO, with a Terminal Poly[EO] Block, by Cationic Mechanism The glass reactor described in the Example 1 was charged with 123 parts by weight of a hybrid polyol, namely, a homopolymer of PO, as synthesized in Example 1, and 0.22% by weight $HBF_4$ solution (in a solution of diethyl ether that is 54% by weight $HBF_4$). 22 parts by weight of ethylene oxide were added from the dropping funnel with mantle cooled at 5° C. over 3 hours to this mixture, which was maintained at 5 to 9° C. After the addition of EO, the reaction mass was stirred around 1 hour for the consumption of unreacted EO. The resulting polyol was purified, as done in Examples 3 and 4. The resulting hybrid polyol was a block copolymer of PO-EO initiated by a vegetable oil polyol, having around 15% by weight EO as a terminal block. It had an OH#=42 mg KOH/g, a Mn=4200, a viscosity of 4.5 Pa·s at 25° C. and an acid number of 0.21 mg KOH/g. This polyol had a biobased content of 23% and a primary hydroxyl content of 62%. The content of cyclic oligomers derived from PO and EO in this polyol was <1%.

Example 6

Block Copolymer of PO-EO, with a Terminal Poly[EO] Block, by Cationic Mechanism A block copolymer of PO-EO hybrid polyol was synthesized in the same way as the polyol in Example 5 except that the ethoxylation reaction was carried out in a pressurized stainless steel reactor at 35 to 45° C. EO was introduced in the reactor for 3 hours from a pressure vessel (with an internal pressure of 4 bars of nitrogen) with a pump with variable flow. Before the EO addition, an inert atmosphere of nitrogen of around 14 to 15 p.s.i. was created in the reactor. During the EO addition, the pressure was very low, around 20 to 22 p.s.i. A block copolymer PO-EO hybrid polyol with terminal poly [EO] block was obtained. It had an OH#=41 mg KOH/g, a viscosity 4.6 Pa·s at 25° C. and an acid number 0.2 mg KOH/g after purification. The polyol was practically identical to the polyol obtained in Example 5 (in the glass reactor at low temperatures).

Example 7

Synthesis of Homopolymers of PO by Coordinative Mechanism

A stainless steel pressure reactor was charged with 60 parts by weight of soybean polyol having an OH#=173 mg KOH/g, a Mn=1100, a viscosity 7 Pa·s at 25° C. and 200 ppm coordinative catalyst, with the following composition:

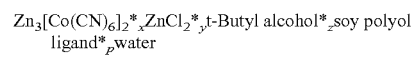

The soy polyol used as starter, which was prepared by ring opening of epoxy rings of epoxidized soybean oil with methanol, was an excellent ligand for the Zn coordinative compound. The content of t-butyl alcohol was around 6% by weight of the coordinative catalyst. The content of soy polyol ligand in the coordinative catalyst was around 24% by weight, and the water content of the coordinative catalyst was around 0.5% by weight. $ZnCl_2$ was approximately at an equimolar concentration with $Zn_3[Co(CN)_6]_2$.

The reactor was purged with nitrogen until an inert nitrogen atmosphere of 10 to 12 p.s.i. was obtained. To the reactor, which was heated at 105 to 110° C., around 50 parts by weight of PO was added with a pump with variable flow until the pressure in the reactor reached 55 to 60 p.s.i. The reactor was maintained under vigorous stirring, at 105 to 110° C. for 45 to 60 minutes. After this period of time, the pressure was decreased suddenly, the induction period was finished, and the coordinative catalyst was activated. 200 parts by weight of PO were added with the pump with variable flow over 2 hours while maintaining the pressure at around 35 to 40 p.s.i. The rate of consumption of PO was very high, proving that the soybean polyol was an excellent starter for PO polymerization with a coordinative catalyst.

After the addition of a given quantity of PO, the reactor was maintained under continuous stirring at 105 to 110° C. for one hour for total consumption of unreacted PO. The pressure was decreased from 35 to 40 p.s.i to around 10 p.s.i. The traces of unreacted monomer were removed by maintaining the reactor under vacuum (50 to 100 mmHg) for 40 to 60 minutes. The resulting polyol was a transparent, slightly yellow liquid. It had an OH#=44 mg KOH/g, a Mn=4200, a viscosity of 5 Pa·s at 25° C. and an acid number of 0.3 mg KOH/g. This polyol can be is used for the production of polyurethanes without any purification, due to the very low concentration of catalyst.

The coordinative catalyst was made as follows: Two solutions were prepared. Solution 1 was 8 g of $K_3[Co(CN)_6]$ dissolved in 140 ml water. Solution 2 was 25 g of $ZnCl_2$ dissolved in 40 ml water. By adding solution 2 to solution 1 (solution 1 well stirred) a white precipitate of $Zn_3[Co(CN)_6]$ was formed. To the slurry was added 200 ml of a solution consisting in 50% tert-butyl alcohol and 50% water (by volume). The suspension was stirred 1 hour and the solid was filtered (or centrifuged). The resulting solid was suspended again in 200 ml of solution containing 70% tert butyl-alcohol and 30% water. The slurry was stirred for an additional hour and filtered (or centrifuged). The solid was added to 200 ml of a solution of 20% vegetable oil polyol and 80% tert butyl alcohol (by weight), heated at 50° C. and stirred for 1 hour, filtered, washed with 100 ml of tert-butyl alcohol and dried around 4 hours in an oven under vacuum at a temperature of not more than 70° C. A bright white solid powder was obtained. The catalyst had the following composition: Zn-20-21%; Co-9.5-11%; tert-butyl alcohol: 6-7%; and vegetable oil polyol: 20-24%.

Example 8

PO Homopolymer Initiated by Hydroformylated Soy Polyol by Coordinative Mechanism A hybrid biobased-petrochemical polyol was synthesized in the same way as described in Example 7 except that a hydroformylated soy polyol (HF polyol) was used. The HF polyol had a hydroxyl number OH#=233 mg KOH/g and a functionality f=4 primary OH groups/mol. Thus, 60 parts by weight of HF polyol in the presence of 200 ppm of the same coordinative catalyst as used in Example 7 were charged to the reactor. 200 parts by weight of PO were added at a temperature of 105 to 110° C. and at a pressure of 35 to 40 p.s.i. A homopolymer of PO hybrid polyol was obtained having a hydroxyl number of 55 mg KOH/g, a Mn=4080, a viscosity of 5 Pa·s at 25° C. and an acid number of 0.23 mg KOH/g. The biobased part of this polyol was 23% by weight.

Example 9

PO Homopolymer Initiated by a Soy Polyol Obtained by Hydrogenation of Epoxidized Soybean Oil, Using a Coordinative Catalyst A hybrid biobased-petrochemical polyol was synthesized in the same way as described in Example 7 except that a polyol obtained by hydrogenation of epoxydized soybean oil was used. The epoxidized soybean oil had an OH #=240 mg KOH/g and a functionality of 4 OH secondary groups/mol. 60 g of hydrogenated soybean oil polyol in the presence of 200 ppm of the same coordinative catalyst as used in Example 7 was charged to the reactor. Around 200 parts of PO were added at a temperature 105 to 110° C. and a pressure of 35 to 40 p.s.i. A hybrid polyol was obtained with a hydroxyl number OH=55.6 mg KOH/g, a Mn=4030, a viscosity of 4.8 Pa·s at 25° C. and an acid number of 0.3 mg KOH/g.

Example 10

Random Copolymer PO-EO by Coordinative Mechanism

A hybrid biobased-petrochemical polyol, which was a random copolymer of PO-EO, was synthesized in the same way as the homopolymers of PO described in Example 7, in the presence of the same coordinative catalyst, except that 200 parts by weight of a homogeneous mixture of PO-EO containing 15% by weight EO was added to 60 parts by weight of the initiator. The initiator was a soybean polyol obtained by the reaction of an epoxidized soybean oil with methanol. The addition of the monomer mixture and the treatment and elimination of unreacted monomers was the same as described in Example 7. A random copolymer of PO-EO hybrid polyol was obtained. It had a hydroxyl number of 42 mg KOH/g, a Mn=4400, a viscosity of 5.2 Pa·s at 25° C. and an acid number of 0.18 mg KOH/g. The final polyol contained 11.5% by weight EO randomly distributed in the polyether chains. The biobased content in this polyol was 23% by weight.

Example 11

Random Copolymer of PO-EO by Coordinative Mechanism, with High Biobased Content

A random copolymer PO-EO initiated by a soy polyol and having a high biobased content was synthesized in the same way as in Example 11 except that, to the 60 parts by weight of soybean polyol of OH#173 mg KOH/g used as starter, only 125 parts by weight of a mixture of PO-EO containing 15% by weight EO was added. The hybrid polyol obtained had a hydroxyl number of 56 mg KOH/g, a Mn=3300, a viscosity of 2.8 Pa·s at 25° C., an acid number of 0.3 mg KOH/g and a biobased content of 32.4% by weight. The polyols synthesized in Examples 10 and 11 can be used for continuous slabstock flexible polyurethane foams.

Example 12

Block Copolymer of PO-EO; PO Block Obtained by Coordinative Mechanism and Poly[EO] Block Obtained by Cationic Mechanism A PO homopolymer, initiated by a soy polyol obtained from epoxidized soybean oil and methanol, was synthesized in the same way as described in Example 7. The same stainless steel reactor was charged at room temperature with 120 parts of a polyol obtained as in the Example 7 and 0.22% by weight $HBF_4$ solution (in a solution of diethyl ether that is 54% by weight $HBF_4$). After purging the reactor with nitrogen and the creation of an inert atmosphere of 15 to 20 p.s.i. of nitrogen, the reactor was heated to 35 to 40° C. At this temperature, to the propoxylated soy polyol, 22 parts of ethylene oxide were added from a pressure vessel by using a pump with variable flow for around 2 hours. The addition rate of EO was very low at 35 to 45° C. and at a low pressure of around 22 to 25 p.s.i. After the addition of the ethylene oxide, the reactor was maintained under continuous stirring around 40 to 60 minutes for consumption of unreacted ethylene oxide. The last traces of unreacted ethylene oxide were removed by vacuum distillation. The acid catalyst was removed as was described in Examples 1-6. The resulting PO-EO block copolymer hybrid polyol had around 15% by weight EO as a terminal block, had a hydroxyl number of 38 mg KOH/g, a Mn=4870, a viscosity of 3.7 Pa·s at 25° C. and an acidity of 0.31 mg KOH/g. It had 73% by weight primary hydroxyl content.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

We claim:

1. A method of making a biobased petrochemical hybrid polyol, comprising:
   (1) providing a vegetable oil-based polyol; and
   (2) forming and reacting a reaction mixture by adding to the vegetable oil-based polyol in the presence of the catalyst $HBF_4$, at least one cyclic ether over a period of about 4 to about 8 hours to produce said biobased-petrochemical hybrid polyol in a polyaddition reaction;
   wherein said reaction mixture is maintained at a temperature of about −10° C. to about 10° C.

2. The method of claim 1 wherein said at least one cyclic ether is selected from the group consisting of alkylene oxides, oxetanes, tetrahydrofurans, and combinations thereof.

3. The method of claim 1 wherein said at least one cyclic ether is an alkylene oxide selected from the group consisting of propylene oxide, butylene oxides, and combinations thereof.

4. The method of claim 1 wherein said at least one cyclic ether comprises tetrahydrofuran and propylene oxide.

5. The method of claim 1 wherein providing a vegetable oil-based polyol comprises reacting an alcohol with an epoxidized vegetable oil to produce a vegetable oil-based polyol.

6. The method of claim 1 wherein providing a vegetable oil-based polyol comprises hydroformylation of a vegetable oil to produce a vegetable oil-based polyol.

7. The method of claim 1 wherein providing a vegetable oil-based polyol comprises ozonolysis of a vegetable oil to produce a vegetable oil-based polyol.

8. The method of claim 1 wherein providing a vegetable oil-based polyol comprises hydrogenation of epoxidized vegetable oil to produce a vegetable oil-based polyol.

9. The method of claim 1 wherein said vegetable oil-based polyol has a hydroxyl number of about 100 to about 600 mg KOH/g, a viscosity of about 0.5 to about 30 Pa·s at 25° C., and a number average molecular weight of about 600 to about 1200.

10. The method of claim 1 wherein said cyclic ether is a mixture of ethylene oxide and propylene oxide and wherein said biobased petrochemical polyol that is produced comprises a vegetable oil-based polyol segment and a poly [propylene oxide-ethylene oxide] random copolymer segment.

11. The method of claim 1 wherein said cyclic ether is propylene oxide and wherein said biobased petrochemical polyol that is produced comprises a vegetable oil-based segment and a polypropylene oxide homopolymer segment.

12. The method of claim 1 wherein adding to the vegetable oil-based polyol in the presence of the catalyst $HBF_4$ at least one cyclic ether comprises adding to the vegetable oil-based polyol, propylene oxide to produce a polypropylene oxide homopolymer segment followed by adding,
   ethylene oxide and wherein said biobased petrochemical polyol comprises a vegetable oil-based polyol segment and a propylene oxide-ethylene oxide block copolymer segment having a terminal polyethylene oxide block.

13. The product of claim 12 wherein said polyethylene oxide-ethylene oxide block copolymer segment has about 60% to about 80% terminal primary hydroxyl groups.

14. The product of the process of claim 1.

15. The product of claim 14 wherein said product has a number average molecular weight of about 3000 to about 6000 and has a structure that is about 22% to about 36% bio-based, said bio-based portion being derived from the initial vegetable oil-based polyol.

16. A method of making a flexible polyurethane foam comprising:
   (1) providing a vegetable oil-based polyol;
   (2) forming and reacting a reaction mixture by adding to the vegetable oil-based polyol in the presence of the catalyst $HBF_4$, at least one cyclic ether over a period of about 4 to about 8 hours to produce a biobased petrochemical hybrid polyol in a polyaddition reaction, wherein said reaction mixture is maintained in a nitrogen atmosphere at a temperature of about
   −10° C. to about 10° C.; and
   (3) reacting said biobased petrochemical hybrid polyol with an isocyanate to create a flexible polyurethane.

17. The method of claim 1 wherein said reaction mixture is maintained at a temperature of from 0° C. to 10° C.

18. The method of claim 1 wherein said reaction mixture is maintained at a temperature of from 5° C. to 9° C.

\* \* \* \* \*